(12) United States Patent
Bohlmann

(10) Patent No.: US 7,574,835 B2
(45) Date of Patent: Aug. 18, 2009

(54) COMPOSITE-TO-METAL JOINT

(75) Inventor: Raymond E. Bohlmann, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 768 days.

(21) Appl. No.: 11/100,915

(22) Filed: Apr. 7, 2005

(65) Prior Publication Data

US 2006/0240220 A1    Oct. 26, 2006

(51) Int. Cl.
*E04B 1/00* (2006.01)
*E04C 2/38* (2006.01)
*B29C 65/00* (2006.01)
*B63B 3/00* (2006.01)

(52) U.S. Cl. .................. 52/272; 156/293; 52/800.1; 52/800.12; 114/85

(58) Field of Classification Search ............. 52/578, 52/582.1, 793, 797.1, 800.1, 800.12, 800.18, 52/309.2, 272; 114/65 R, 85, 356, 79 R, 114/83, 88, 357; 428/423.1; 403/265–268; 156/293

See application file for complete search history.

(56) References Cited

U.S. PATENT DOCUMENTS

| | | | | |
|---|---|---|---|---|
| 2,038,439 A | * | 4/1936 | Moss | 52/272 |
| 2,104,869 A | * | 1/1938 | Levy | 52/274 |
| 2,267,330 A | * | 12/1941 | Goss | 403/265 |
| 3,098,698 A | * | 7/1963 | Glynn | 264/261 |
| 3,125,192 A | * | 3/1964 | Ramseur | 52/582.1 |
| 3,214,888 A | * | 11/1965 | De Ridder | 114/88 |
| 3,232,013 A | * | 2/1966 | Dow | 52/73 |
| 3,349,533 A | * | 10/1967 | Gregoire | 52/716.8 |
| 3,476,422 A | * | 11/1969 | Campbell | 52/793.1 |
| 3,763,612 A | * | 10/1973 | Saino | 52/309.14 |
| 3,820,298 A | * | 6/1974 | Kirsch | 52/475.1 |
| 3,852,916 A | * | 12/1974 | Laby | 49/409 |
| 3,886,699 A | * | 6/1975 | Bergmann, Jr. | 52/91.1 |
| 3,960,637 A | * | 6/1976 | Ostrow | 156/293 |
| 4,163,348 A | * | 8/1979 | Thomas, Jr. | 52/241 |
| 4,219,980 A | * | 9/1980 | Loyd | 52/309.1 |
| 4,385,562 A | * | 5/1983 | Bitsch et al. | 105/163.1 |
| 4,530,194 A | * | 7/1985 | Linton et al. | 52/712 |
| 4,671,470 A | * | 6/1987 | Jonas | 244/119 |
| 4,891,920 A | * | 1/1990 | Pingston | 52/145 |
| 4,915,590 A | * | 4/1990 | Eckland et al. | 416/225 |
| 4,931,340 A | * | 6/1990 | Baba et al. | 428/73 |
| 4,987,699 A | * | 1/1991 | Gold | 49/375 |

(Continued)

FOREIGN PATENT DOCUMENTS

EP    312622 A1 *   4/1989

(Continued)

*Primary Examiner*—Robert J Canfield
*Assistant Examiner*—Charissa Ahmad
(74) *Attorney, Agent, or Firm*—Rozenblat IP LLC

(57) ABSTRACT

A method and an apparatus for joining a composite structural member to a metallic structural member is provided. The apparatus includes a composite structural member, a metallic transitional member, and a metallic structural member. The metallic transitional member may have a substantially H-shaped cross sectional geometry and may include at least two tapered flanges and at least one web portion. An adhesive joint may be used to attach the composite structural member to the tapered flange and the web portion. At least two welds attach the metallic transitional member to the metallic structural member.

29 Claims, 5 Drawing Sheets

U.S. PATENT DOCUMENTS

| | | | |
|---|---|---|---|
| 5,036,788 A * | 8/1991 | Unger | 114/355 |
| 5,397,201 A * | 3/1995 | Novak et al. | 405/195.1 |
| 5,471,806 A * | 12/1995 | Rokhlin | 52/437 |
| 5,472,290 A * | 12/1995 | Hulls | 403/393 |
| 5,476,704 A * | 12/1995 | Kohler | 428/119 |
| 5,570,548 A * | 11/1996 | Hopper | 52/204.5 |
| 5,580,636 A * | 12/1996 | Kampmann et al. | 428/119 |
| 5,704,509 A * | 1/1998 | Rosenkrantz | 220/216 |
| 5,758,594 A * | 6/1998 | Siewert | 114/357 |
| 5,761,866 A * | 6/1998 | Maylon | 52/366 |
| 5,848,508 A * | 12/1998 | Albrecht | 52/309.9 |
| 5,972,524 A * | 10/1999 | Childress | 428/615 |
| 6,287,666 B1 * | 9/2001 | Wycech | 428/122 |
| 6,374,570 B1 * | 4/2002 | McKague, Jr. | 52/762 |
| 6,505,449 B1 * | 1/2003 | Gregori | 52/514 |
| 6,520,706 B1 * | 2/2003 | McKague et al. | 403/265 |
| 6,824,851 B1 * | 11/2004 | Locher et al. | 428/76 |
| 6,849,150 B1 * | 2/2005 | Schmidt | 156/285 |
| 6,863,767 B2 * | 3/2005 | Bersuch et al. | 156/293 |
| 6,874,543 B2 * | 4/2005 | Schmidt et al. | 139/383 R |
| 6,945,727 B2 * | 9/2005 | Christman et al. | 403/109.8 |
| 7,028,441 B2 * | 4/2006 | Dahl | 52/450 |
| 7,037,568 B1 * | 5/2006 | Rogers et al. | 428/119 |
| 7,045,084 B1 * | 5/2006 | Reis et al. | 264/138 |
| 7,198,692 B2 * | 4/2007 | Bersuch et al. | 156/293 |
| 7,244,487 B2 * | 7/2007 | Brantley et al. | 428/119 |
| 7,371,304 B2 * | 5/2008 | Christman et al. | 156/293 |
| 7,393,488 B2 * | 7/2008 | Grose et al. | 264/254 |
| 2002/0053175 A1 * | 5/2002 | McKague et al. | 52/309.13 |
| 2002/0178992 A1 * | 12/2002 | Lewit | 114/357 |
| 2004/0055226 A1 * | 3/2004 | Dahl | 52/86 |
| 2007/0256386 A1 * | 11/2007 | Ito | 52/582.1 |

FOREIGN PATENT DOCUMENTS

| | | |
|---|---|---|
| FR | 2703379 A1 * | 10/1994 |
| JP | 02162187 A * | 6/1990 |

* cited by examiner

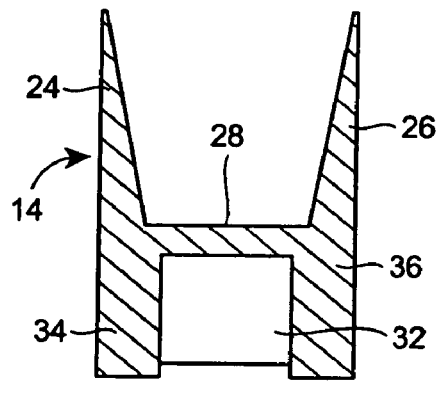
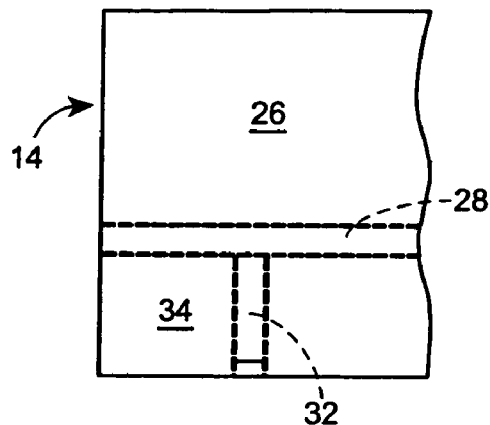
FIG. 2           FIG. 3
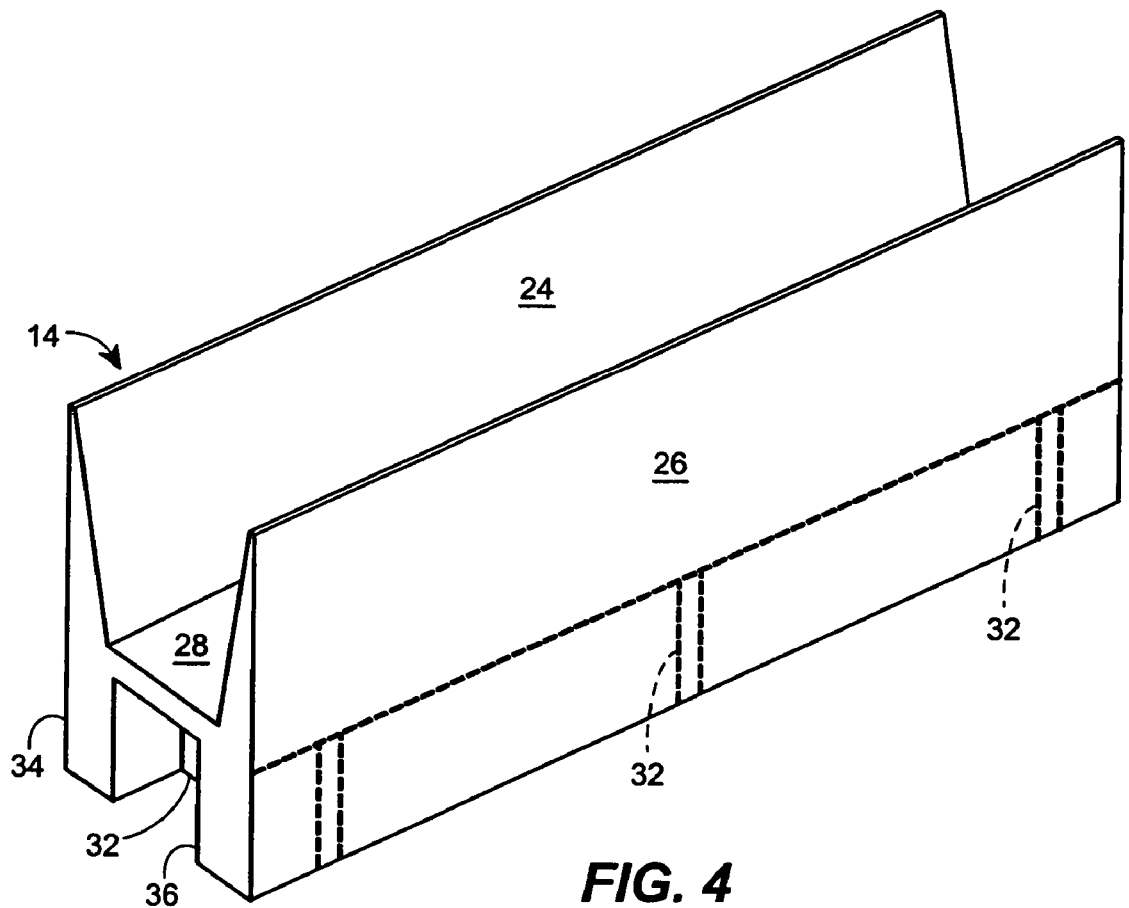
FIG. 4

COMPOSITE-TO-METAL JOINT

This invention was made with Government support under contract number SCRA 2001-508 awarded by the United States Navy. The Government has certain rights in this invention.

BACKGROUND

1. Field of the Invention

The invention relates generally to composite structures and, more specifically, to joining composite structures to metallic structures.

2. Background Description

Recently, composite structures have been increasingly used on advanced designs for vehicles such as aircraft and ships. Reasons for using composite structures include saving weight as compared to steel structures, reducing radar cross section increasing corrosion resistance, and reducing life cycle costs.

Complex bolted joints have been developed to attach composite panels, such as balsa core composite sandwich panels, to steel structure, such as on a deck of a ship, using metal fasteners (e.g., bolts) that may be expensive and may create corrosion problems between the fastener and the surrounding steel. However, such joints can be expensive and difficult to manufacture. In addition, metal fasteners may cause radar cross section problems. Furthermore, the process for joining the composite structure to the steel deck using fasteners involves expensive drilling operations and assembly operations that must typically be performed at a shipyard.

The present invention is directed to overcoming one or more of the problems or disadvantages associated with the prior art.

SUMMARY OF THE INVENTION

In accordance with one aspect of the invention, an apparatus for joining a composite structural member to a metallic structural member is provided. The apparatus includes a composite structural member, a metallic transitional member, and a metallic structural member. The metallic transitional member may have a substantially H-shaped cross sectional geometry and may include at least one tapered flange and at least one web portion. An adhesive joint may be used to attach the composite structural member to the tapered flange and the web portion. At least one weld attaches the metallic transitional member to the metallic structural member.

According to yet another aspect of the invention, the metallic transitional member may include at least one gusset that is positioned to align with a stiffener on the metallic structural member.

According to still another aspect of the invention, a method is provided for attaching a composite structural member to a metallic structural member. This method may include: manufacturing a composite structural member; machining mating surfaces of a composite structural member; fabricating a metallic transitional member; adhesively bonding the composite structural member to the metallic transitional member; and welding the transitional member to the metallic structural member. The method may further include machining a surface of the transitional structural member to match a surface of the metallic structural member. The method may also include providing a gap between a gusset portion of the metallic transitional member and the metallic structural member.

The features, functions, and advantages can be achieved independently in various embodiments of the present invention or may be combined in yet other embodiments.

BRIEF DESCRIPTION OF THE DRAWINGS

FIG. 2 is a cross-sectional view of a metallic transitional member forming part of the composite to metal joint assembly of FIG. 1;

FIG. 3 is a side view of a portion of the transitional metallic of FIG. 2;

FIG. 4 is a perspective view of the metallic transitional member of FIG. 2;

DETAILED DESCRIPTION

Figure 1:
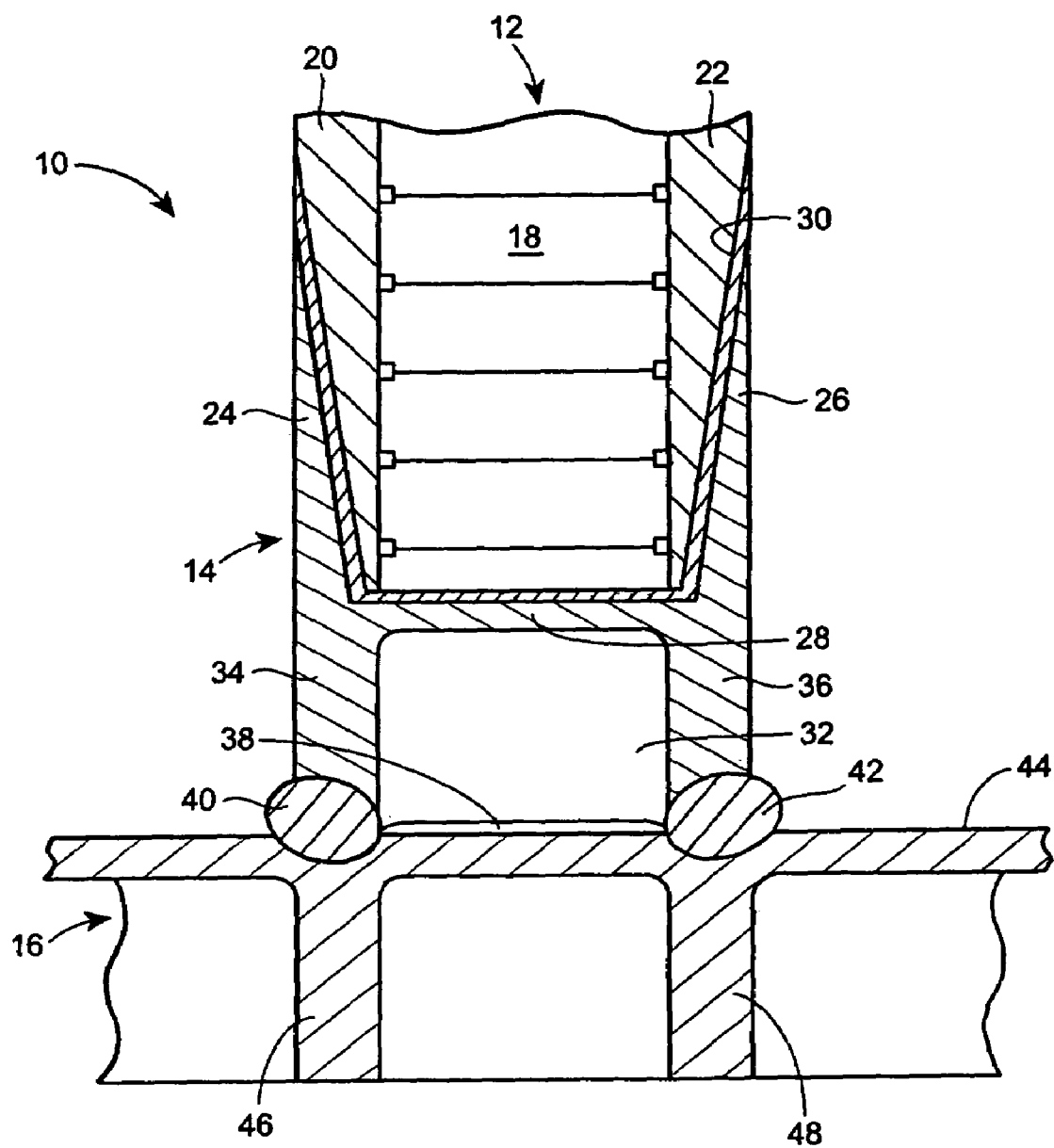
FIG. 1 is a cross-sectional view of a composite to metal joint assembly.
Figure 5:
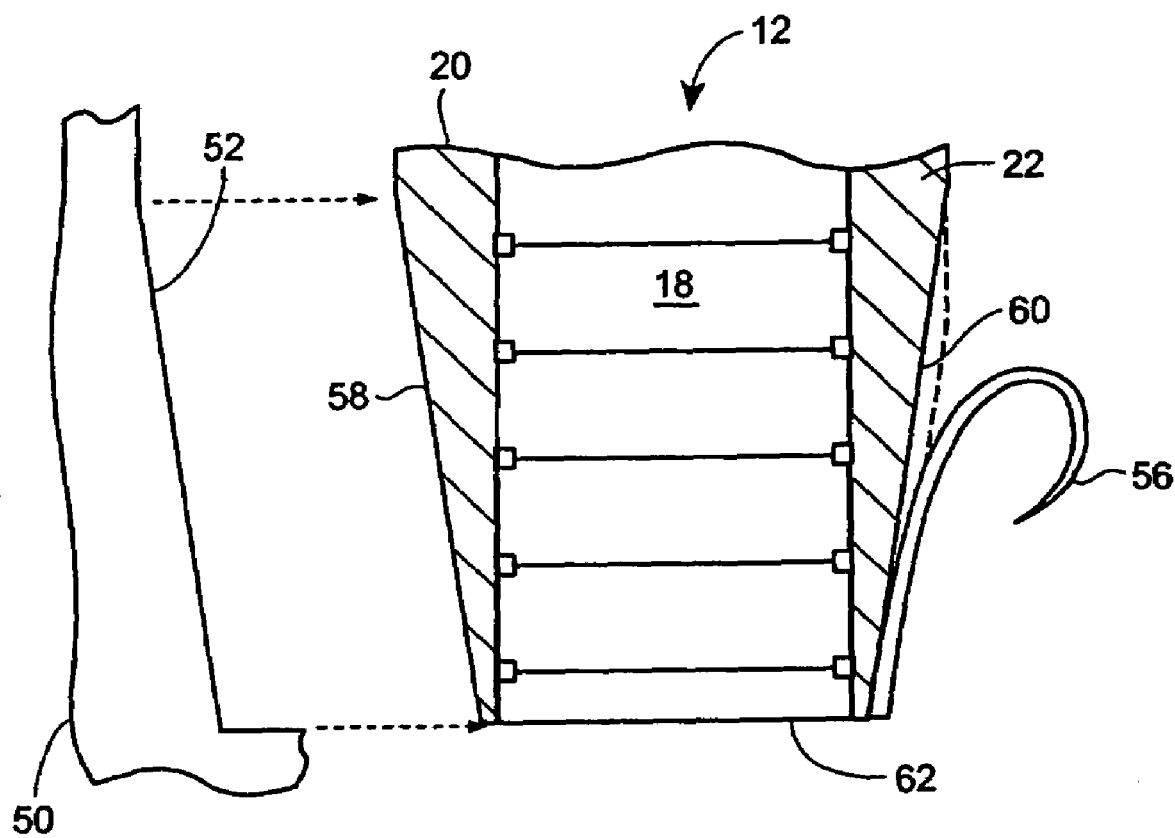
FIG. 5 is a cross-sectional view of a composite structural member that may be used in the assembly of FIG. 1, illustrating a machining process and an outer mold line tool surface that may be used to form mating surfaces on the composite structural member.

With reference initially to FIG. 1, a composite to metal joint assembly, generally indicated at 10, includes a composite structural member 12, a metallic transitional member 14, and a metallic structural member 16. The composite structural member 12 may be a balsa core composite sandwich panel, and may include a core portion 18, for example, made of a balsa core material, a first face sheet 20 that may be made from an E-glass fabric/vinyl ester material, and a second face sheet 22 that may also be made from an E-glass fabric/vinyl ester material. The composite structural member 12 may be fabricated using a vacuum assisted resin transfer molding process. The metallic transitional member 14 may include a first tapered flange 24, a second tapered flange 26, and a web portion 28, as seen in FIGS. 2 through 4.

The composite structural member 12 may be bonded to the metallic transitional member 14 by an adhesive 30, that may be, for example a paste adhesive, such as a cold cure epoxy adhesive paste (e.g., Hysol EA9394 Paste Adhesive), as a suitable paste adhesive material for use as the adhesive 30.

The metallic transitional member 14 may also include a gusset portion 32, a first leg portion 34 and, a second leg portion 36. A gap 38 may be provided between the gusset portion 32 and the metallic structural member 16. The metallic transitional member 14 may be attached to the metallic structural member 16 by welding, for example by using a first weld 40 and a second weld 42 to attach the first leg portion 34 and the second leg portion 36, respectively, to a surface 44 of the metallic structural member 16. The metallic structural member 16 may include a first stiffener 46 and a second stiffener 48 that each align with the first leg portion 34 and the second leg portion 36, respectively to provide enhanced structural capacity (e.g., higher strength and/or stiffness) of the composite to metal joint assembly 10.

In order to form the composite to metal joint assembly 10, the composite structural member 12 may be machined, and an outer mold tool 50 having an outer mold line tool surface 52 may be used to assist in machining excess material from the composite structural member 12, such as, for example, machined scarf material 56, off of the composite structural member 12 to provide mating surfaces such as a first tool scarf joint surface 58, a second machined scarf joint surface 60, and a third machined scarf joint surface 62 that follow contours of the metallic transitional member 14. Sanding and/or grit blasting may be used as final surface preparation for the mating surfaces.

Figure 6:
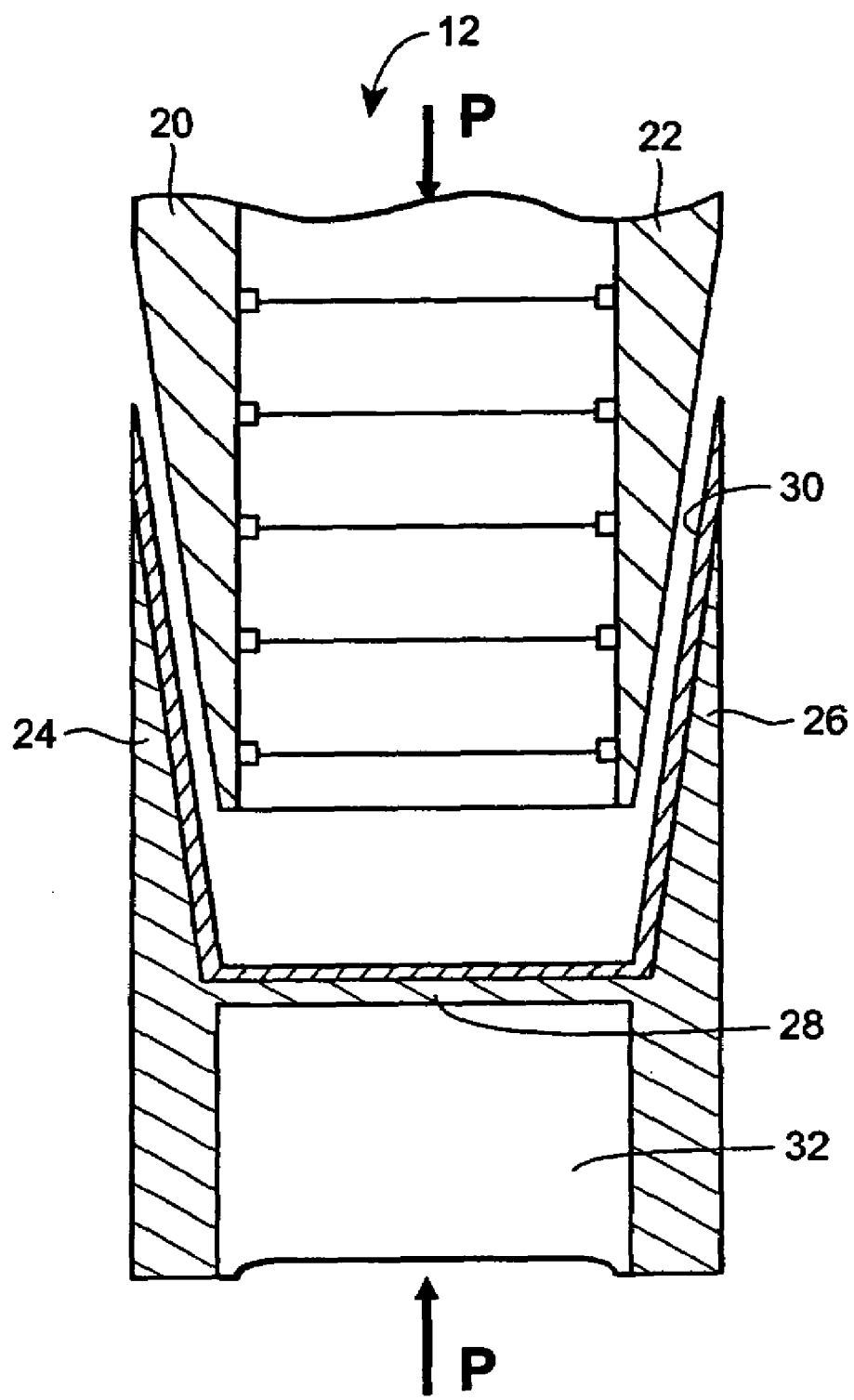
FIG. 6 is a cross-sectional view of the joint assembly of FIG. 1 illustrating an adhesive bonding process for forming the joint assembly of FIG. 1.

With reference to FIG. 6, after machining the composite structural member 12, it may be inserted into the metallic transitional member 14 to which adhesive 30 has been applied, and pressure may be applied to the composite structural member 12 and the metallic transitional member 14, as indicated by the arrows labeled "P" in FIG. 6.

Once the composite structural member 12 has been securely bonded to the metallic transitional member 14, the metallic transitional member 14 may be attached to the metallic structural member 16, for example, by welding. Precautions such as the use of chill bars may be used to prevent welding heat from damaging the composite structural member 12. In addition, the first and second leg portions 34, 36 may be designed with sufficient distance between the welds 40, 42 and the web portion 28 in order to protect the composite structural member 12 from excessive heat due to welding.

Figure 7:
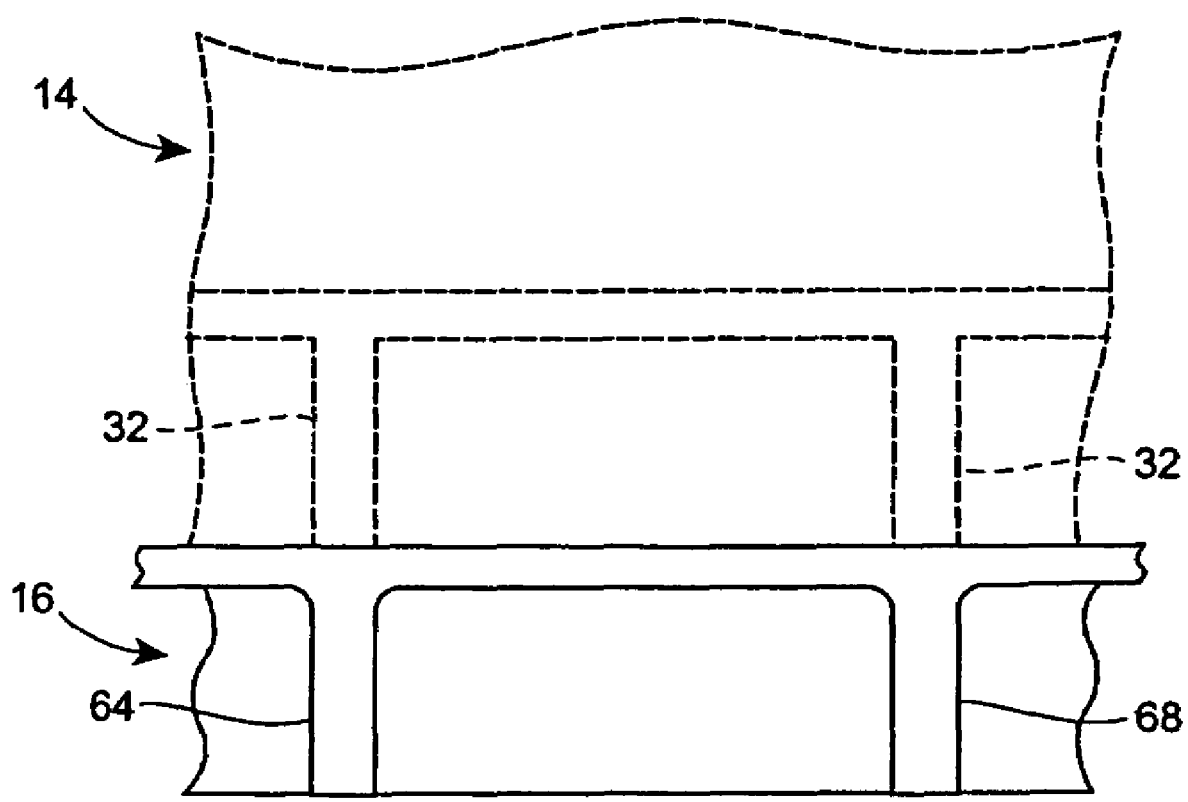
FIG. 7 is a side view of a portion of the metallic transitional member and a metallic structural member, illustrating alignment of gussets in the metallic transitional member with stiffeners of the metallic structural member.

In order to provide enhanced strength and/or structural rigidity, the metallic structural member 16 may include first and second transverse stiffeners 64, 68, as shown in FIG. 7, that align with gussets 32 of the metal transitional member.

One advantage of the composite to metal joint assembly 10 is that the adhesive bonding of the composite structural member 12 to the metallic transitional member 14 may be performed in a composite shop, and the welding may be performed at a different location. For example the metallic structural member 16 may form part of a steel deck of a ship, and the welding may take place at a ship yard, thereby reducing the complexity and time required for the task of attaching a composite panel to the steel deck at the shipyard.

Other aspects and features of the present invention can be obtained from a study of the drawings, the disclosure, and the appended claims.

What is claimed is:

1. An apparatus joining a composite structural member to a metallic structural member, comprising: a metallic transitional member comprising at least two tapered flanges and at least one web portion, wherein the at least two tapered flanges are adhesively attached to face sheets of the composite structural member, and the at least one web portion is adhesively attached to a core portion of the composite structural member, wherein the core portion is disposed between the face sheets of the composite structural member; and at least two welds joining the metallic transitional member to the metallic structural member.

2. The apparatus of claim 1, wherein the metallic transitional member has a substantially H-shaped cross sectional geometry.

3. The apparatus of claim 1, wherein the metallic transitional member includes at least one gusset.

4. The apparatus of claim 3, wherein the metallic structural member includes at least one stiffener and wherein the gusset is positioned in alignment with a stiffener on the metallic structural member.

5. The apparatus of claim 1, wherein the at least two tapered flanges of the metallic transitional member are adhesively attached to the face sheets of the composite structural member using a paste adhesive, and at least one web portion is adhesively attached to the core portion of the composite structural member using the paste adhesive.

6. A composite to metal joint assembly, comprising: a composite structural member, including a core portion, a first face sheet, and a second face sheet; adhesively attached to a metallic transitional member, having a substantially H-shaped cross-sectional geometry, and including a first tapered flange, a second tapered flange, and a web portion; and a metallic structural member welded to the metallic transitional member.

7. The composite to metal joint assembly of claim 6, wherein the composite structural member is a balsa core composite sandwich panel.

8. The composite to metal joint assembly of claim 6, wherein the first and second face sheets are made from an E-glass fabric/vinyl ester material.

9. The composite to metal joint assembly of claim 6, wherein the composite structural member is fabricated using a vacuum assisted resin transfer molding process.

10. The composite to metal joint assembly of claim 9, wherein the composite structural member is adhesively bonded to the metallic transitional member by a paste adhesive.

11. The composite to metal joint assembly of claim 6, wherein the metallic transitional member includes a gusset portion.

12. The composite to metal joint assembly of claim 11, wherein a gap is provided between the gusset portion and the metallic structural member.

13. The composite to metal joint assembly of claim 6, wherein the metallic transitional member includes a first leg portion and a second leg portion.

14. The composite to metal joint assembly of claim 13, wherein the first leg portion and the second leg portion are each welded to the metallic structural member.

15. The composite to metal joint assembly of claim 13, wherein the metallic structural member includes a first stiffener and a second stiffener that each align with the first leg portion and the second leg portion, respectively.

16. A structural apparatus securing a composite structural member to a steel deck structure of a ship, comprising: a metallic transitional member comprising a substantially H-shaped cross-sectional geometry and at least two tapered flanges which are adhesively attached to face sheets of the composite structural member; and at least two welds joining the metallic transitional member to the steel deck structure.

17. The apparatus of claim 16, wherein the metallic transitional member includes at least one web portion.

18. The apparatus of claim 17, wherein the composite structural member is further adhesively attached to the at least one web portion.

19. The apparatus of claim 16, wherein the metallic transitional member includes at least one gusset.

20. The apparatus of claim 19, wherein the steel deck structure includes at least one stiffener and wherein the at least one gusset is positioned to align with a stiffener on the steel deck structure.

21. The apparatus of claim 16, wherein the at least two tapered flanges of the metallic transitional member are adhesively attached to the face sheets of the composite structural member using a paste adhesive.

22. The apparatus of claim 1 wherein the metallic transitional member is disposed in between the composite structural member and the metallic structural member.

23. The apparatus of claim 1 wherein the metallic transitional member is disposed over a top portion of the metallic structural member and the composite structural member is disposed over a top portion of the metallic transitional member and the top portion of the metallic structural member.

24. The composite to metal joint assembly of claim 6 wherein the metallic transitional member is disposed in between the composite structural member and the metallic structural member.

25. The composite to metal joint assembly of claim 6 wherein the metallic transitional member is disposed over a top portion of the metallic structural member and the composite structural member is disposed over a top portion of the metallic transitional member and the top portion of the metallic structural member.

26. The apparatus of claim 16 wherein the metallic transitional member is disposed in between the composite structural member and the steel deck structure.

27. The apparatus of claim 16 wherein the metallic transitional member is disposed over a top portion of the steel deck structure and the composite structural member is disposed over a top portion of the metallic transitional member and the top portion of the steel deck structure.

28. The apparatus of claim 1 wherein the face sheets of the composite structural member are tapered, and wherein the core portion is disposed between the tapered face sheets of the composite structural member.

29. The structural apparatus of claim 16 wherein the face sheets of the composite structural member are tapered, and the substantially H-shaped cross-sectional geometry and the at least two tapered flanges are adhesively attached to the tapered face sheets of the composite structural member.

* * * * *

UNITED STATES PATENT AND TRADEMARK OFFICE
CERTIFICATE OF CORRECTION

PATENT NO. : 7,574,835 B2  Page 1 of 1
APPLICATION NO. : 11/100915
DATED : August 18, 2009
INVENTOR(S) : Raymond E. Bohlmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this

Seventh Day of September, 2010

David J. Kappos
*Director of the United States Patent and Trademark Office*